(12) United States Patent
Sato et al.

(10) Patent No.: US 11,517,992 B2
(45) Date of Patent: Dec. 6, 2022

(54) ASSEMBLY APPARATUS

(71) Applicant: SUBARU CORPORATION, Tokyo (JP)

(72) Inventors: Yoichi Sato, Tokyo (JP); Marosuke Kikuchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/061,659

(22) Filed: Oct. 2, 2020

(65) Prior Publication Data

US 2021/0138600 A1 May 13, 2021

(30) Foreign Application Priority Data

Nov. 11, 2019 (JP) .............................. JP2019-204051

(51) Int. Cl.
*B23Q 15/06* (2006.01)
*B64F 5/10* (2017.01)

(52) U.S. Cl.
CPC ................ *B23Q 15/06* (2013.01); *B64F 5/10* (2017.01)

(58) Field of Classification Search
CPC .......... B62D 65/024; B64F 5/10; B23P 19/10; G06F 30/15; B23B 49/00; B25J 13/089
See application file for complete search history.

(56) References Cited

U.S. PATENT DOCUMENTS

| | | | |
|---|---|---|---|
| 7,024,032 B2* | 4/2006 | Kidd ...................... | G01B 21/16 348/42 |
| 7,780,070 B2* | 8/2010 | Salour .................. | G05B 19/402 235/375 |
| 7,780,080 B2* | 8/2010 | Owen ................. | G06Q 20/3674 235/382 |
| 7,913,370 B2* | 3/2011 | Savoy .................... | B62D 65/18 29/407.1 |
| 8,010,226 B2* | 8/2011 | Crothers ............ | G05B 19/4097 700/195 |
| 8,756,792 B2* | 6/2014 | Boyl-Davis ............... | B64C 1/26 29/592 |

(Continued)

FOREIGN PATENT DOCUMENTS

| | | |
|---|---|---|
| EP | 3 199 298 A1 | 8/2017 |
| EP | 3 354 384 A1 | 8/2018 |
| JP | 2016-175157 A | 10/2016 |

OTHER PUBLICATIONS

Extended European Search Report issued in corresponding European Patent Application No. 200 20 0739 dated May 3, 2021.

*Primary Examiner* — Moshe Wilensky
*Assistant Examiner* — Michael W Hotchkiss
(74) *Attorney, Agent, or Firm* — Troutman Pepper Hamilton Sanders LLP

(57) ABSTRACT

An assembly apparatus includes a retainer, a position measurement device, and a machining device. The retainer is configured to hold an assembly. The position measurement device is configured to measure a difference between an intended machining position and an actual machining position of a first coupling hole in a first assembly component. The first coupling hole is capable of being coupled to the assembly. The machining device is configured to form a second coupling hole capable of communicating with the first coupling hole in the assembly based on a reference position set on the assembly and the difference.

2 Claims, 6 Drawing Sheets

(56) References Cited

U.S. PATENT DOCUMENTS

| | | | | |
|---|---|---|---|---|
| 9,757,859 B1* | 9/2017 | Kolb | .................. | G01S 17/06 |
| 9,925,625 B2* | 3/2018 | Turner | .................. | B64F 5/10 |
| 9,952,580 B2* | 4/2018 | Bode | .................. | G05B 19/4097 |
| 10,118,714 B2* | 11/2018 | Reid | .................. | B64F 5/10 |
| 10,324,426 B2* | 6/2019 | Nakashima | .................. | B64F 5/10 |
| 10,807,662 B2* | 10/2020 | Bertolini | .................. | B62D 65/026 |
| 2011/0119919 A1* | 5/2011 | Crothers | .................. | B23P 19/10 |
| | | | | 29/897.2 |
| 2012/0303336 A1* | 11/2012 | Becker | .................. | G01B 11/03 |
| | | | | 703/1 |
| 2015/0367579 A1* | 12/2015 | Laudrain | .................. | B29C 64/393 |
| | | | | 700/98 |
| 2016/0202689 A1* | 7/2016 | Szarski | .................. | G05B 19/4097 |
| | | | | 700/98 |
| 2016/0271747 A1 | 9/2016 | Ono et al. | | |
| 2016/0339587 A1* | 11/2016 | Rublee | .................. | B25J 13/089 |
| 2017/0220021 A1* | 8/2017 | Bode | .................. | G05B 19/4097 |
| 2018/0208328 A1* | 7/2018 | Charlton | .................. | B64C 1/10 |
| 2018/0348730 A1* | 12/2018 | Reekmans | .................. | G05B 19/402 |
| 2019/0003823 A1* | 1/2019 | Hull | .................. | B64F 5/10 |
| 2019/0152547 A1* | 5/2019 | Bertolini | .................. | B23B 35/00 |

* cited by examiner

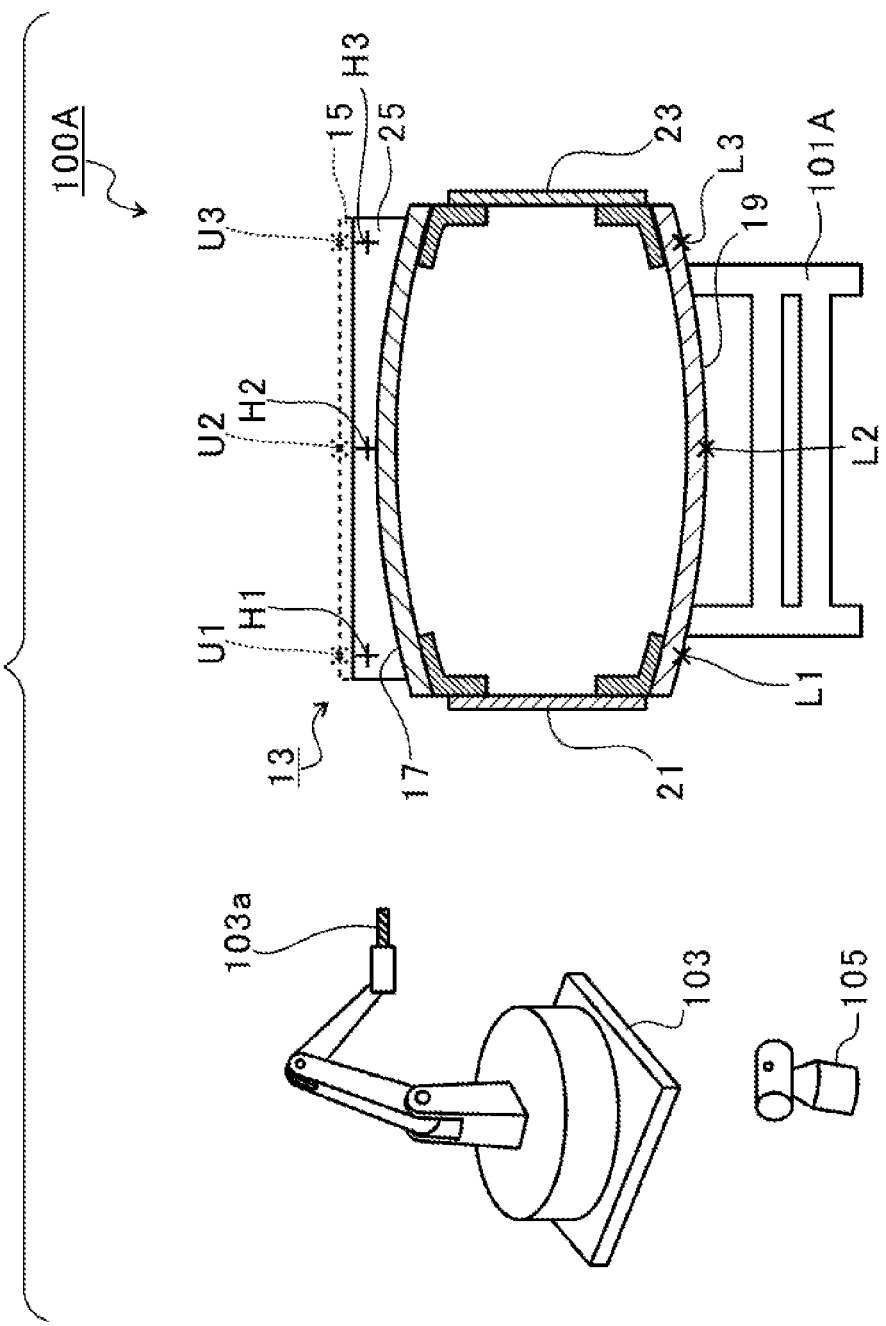

ASSEMBLY APPARATUS

CROSS-REFERENCE TO RELATED APPLICATIONS

The present application claims priority from Japanese Patent Application No. 2019-204051 filed on Nov. 11, 2019, the entire contents of which are hereby incorporated by reference.

BACKGROUND

The disclosure relates to an assembly apparatus.

A center wing of an aircraft includes a plurality of shaped steel materials having webs and flanges. Japanese Unexamined Patent Application Publication No. 2016-175157 discloses a drilling machine that drills a hole in a shaped steel material.

SUMMARY

An aspect of the disclosure provides an assembly apparatus including a retainer, a position measurement device, and a machining device. The retainer is configured to hold an assembly. The position measurement device is configured to measure a difference between an intended machining position and an actual machining position of a first coupling hole in a first assembly component. The first coupling hole is capable of being coupled to the assembly. The machining device is configured to form a second coupling hole capable of communicating with the first coupling hole in the assembly on a basis of a reference position set on the assembly and the difference.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

FIG. 6 schematically illustrates the structure of an assembly apparatus according to a modification.

DETAILED DESCRIPTION

According to the related art, a center wing is retained and positioned with jigs when a hole are drilled in a shaped steel material with a drilling machine. However, the jigs that retain and position the center wing are very expensive. Therefore, it is desirable to achieve both a reduction in the number of jigs and high assembly accuracy.

Thus, it is desirable to provide an assembly apparatus with which both a reduction in the number of jigs and high assembly accuracy can be achieved.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
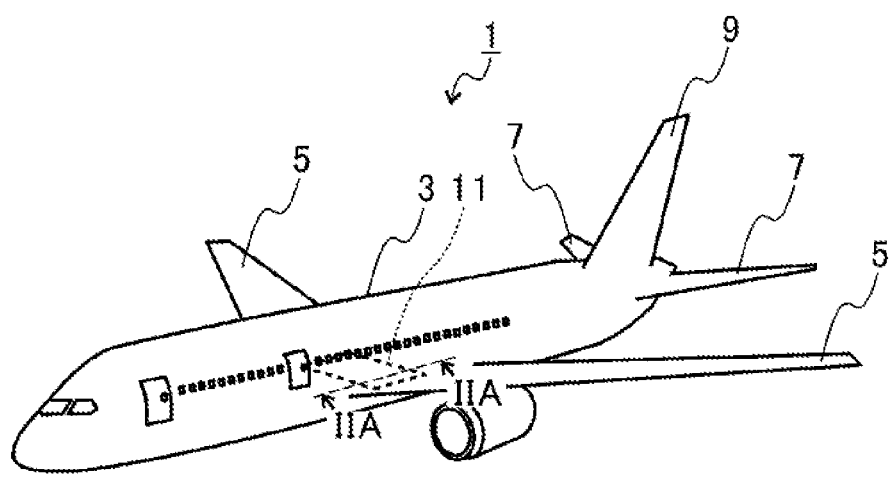
FIG. 1 is a schematic perspective view of an aircraft.

FIG. 1 is a schematic perspective view of an aircraft 1. As illustrated in FIG. 1, the aircraft 1 includes a fuselage 3, a pair of main wings 5, a pair of horizontal tails 7, a vertical tail 9, and a center wing 11. In the following description, the main wings 5, the horizontal tails 7, the vertical tail 9, and the center wing 11 may be referred to simply as wings and tails.

The fuselage 3 extends in a roll axis direction, which is the direction of a roll axis that connects nose and tail ends of the aircraft 1. The main wings 5 are provided at the center of the fuselage 3 in the roll axis direction. The main wings 5 are arranged in a pitch axis direction, which is orthogonal to the roll axis direction, and provided on the left and right sides of the fuselage 3. The main wings 5 extend outward from the fuselage 3 in the pitch axis direction. The main wings 5 have generates vertically upward lift for the aircraft 1.

The horizontal tails 7 are disposed closer to the tail end of the fuselage 3 than the main wings 5 are. The horizontal tails 7 are arranged in the pitch axis direction and provided on the left and right sides of the fuselage 3. The horizontal tails 7 extend outward from the fuselage 3 in the pitch axis direction. The horizontal tails 7 ensures stability of the aircraft 1 around the pitch axis.

The vertical tail 9 is disposed closer to the tail end of the fuselage 3 than the main wings 5 are. The vertical tail 9 extends outward from the fuselage 3 in a yaw axis direction, which is orthogonal to the roll axis direction and the pitch axis direction. The vertical tail 9 has ensures stability of the aircraft 1 around the yaw axis.

The center wing 11 is disposed (mounted) in the fuselage 3. A cabin floor, for example, is disposed vertically above the center wing 11, and a lower surface of the fuselage 3 is disposed vertically below the center wing 11. Similar to the main wings, the center wing 11 is provided at the center of the fuselage 3 in the roll axis direction. The center wing 11 is coupled to the left and right main wings 5, and functions as portions of the main wings 5. The center wing 11 reduces deformation of the main wings 5 due to the lift.

Figure 2A:
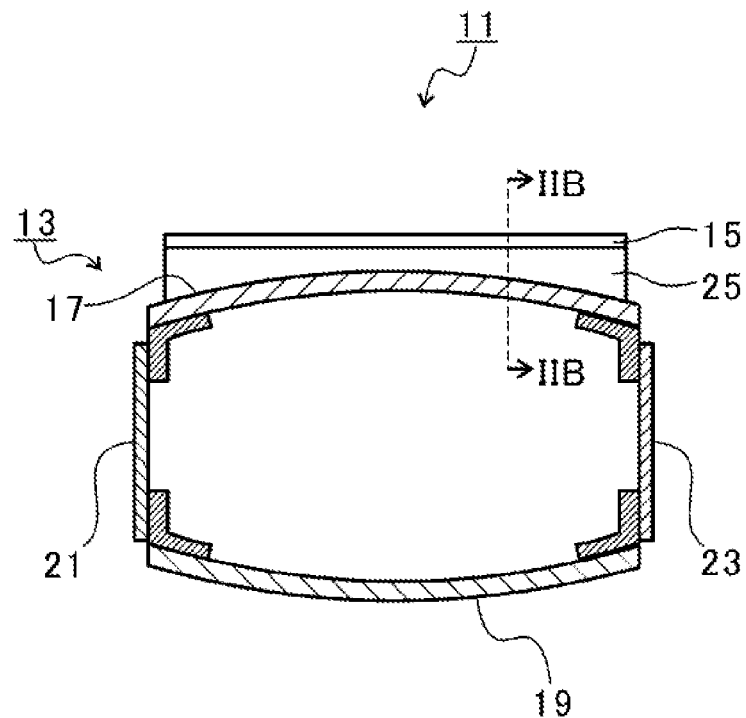
FIG. 2A and FIG. 2B schematically illustrate the structure of a center wing.
Figure 2B:
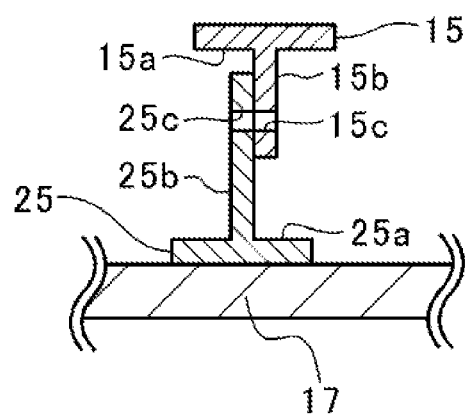

FIG. 2A and FIG. 2B schematically illustrate the structure of the center wing 11. FIG. 2A is a schematic sectional view of the center wing 11 illustrated in FIG. 1 taken along line IIA-IIA. FIG. 2B is a schematic sectional view taken along line IIB-IIB in FIG. 2A.

As illustrated in FIG. 2A, the center wing 11 includes an assembly 13 and a first shaped steel material (first assembly component) 15. The center wing 11 has an integral structure including the assembly 13 and the first shaped steel material 15 and formed by fastening the assembly 13 and the first shaped steel material 15 together with fastening members (not illustrated), such as bolts. The cabin floor, for example, is placed vertically above the first shaped steel material 15.

The assembly 13 has a box structure formed by assembling a plurality of assembly components. In this embodiment, the assembly 13 includes an upper panel 17, a lower panel 19, a front spar 21, a rear spar 23, and a second shaped steel material (second assembly component) 25.

The upper panel 17, which is a plate-shaped member, is disposed to face the lower panel 19 in the vertical direction. The lower panel 19, which is also a plate-shaped member, is disposed vertically below the upper panel 17. The upper panel 17 and the lower panel 19 are curved in this embodiment, but may instead be flat. The front spar 21 and the rear spar 23 are disposed between the upper panel 17 and the lower panel 19.

The front spar 21, which is a plate-shaped member, is disposed to face the rear spar 23 in a horizontal direction. The rear spar 23, which is also a plate-shaped member, is disposed closer to the tail end than the front spar 21 is in the roll axis direction. The front spar 21 is coupled to the upper panel 17 and the lower panel 19 by coupling members, and the rear spar 23 is also coupled to the upper panel 17 and the lower panel 19 by coupling members. Thus, the upper panel 17, the lower panel 19, the front spar 21, and the rear spar 23 are brought together to form a box shape.

The second shaped steel material 25 is positioned vertically above the upper panel 17, and is fixed to the upper surface of the upper panel 17. As illustrated in FIG. 2B, the second shaped steel material 25 is T-shaped and includes a flange 25a and a web 25b. The flange 25a is coupled to the upper panel 17, and the web 25b extends from the flange 25a in a direction away from the upper panel 17. The web 25b has a coupling hole (second coupling hole) 25c. The coupling hole 25c extends through the web 25b in the thickness direction.

The flange 25a and the web 25b extend in the direction from the near side to the far side of FIG. 2B. In other words, as illustrated in FIG. 2A, the second shaped steel material 25 extends between the front spar 21 and the rear spar 23 in the roll axis direction.

The first shaped steel material 15 is positioned vertically above the flange 25a of the second shaped steel material 25. As illustrated in FIG. 2B, the first shaped steel material 15 is T-shaped, and the shape thereof is similar to that of the second shaped steel material 25. The first shaped steel material 15 includes a flange 15a and a web 15b. The flange 15a is disposed to face the flange 25a of the second shaped steel material 25 in the vertical direction. The web 15b extends from the flange 15a in a direction toward the upper panel 17. The web 15b is disposed such that at least a portion thereof overlaps the web 25b of the second shaped steel material 25 in the thickness direction (left-right direction in FIG. 2B). The web 15b has a coupling hole (first coupling hole) 15c. The coupling hole 15c extends through the web 15b in the thickness direction.

The flange 15a and the web 15b extend in the direction from the near side to the far side of FIG. 2B. In other words, as illustrated in FIG. 2A, the first shaped steel material 15 extends between the front spar 21 and the rear spar 23 in the roll axis direction.

The coupling holes 15c and 25c are disposed to face each other in the thickness direction of the webs 15b and 25b. A fastening member (not illustrated) is inserted through the coupling holes 15c and 25c to fasten the first shaped steel material 15 and the second shaped steel material 25 (assembly 13) together. Thus, the center wing 11 is assembled.

Figure 3A:
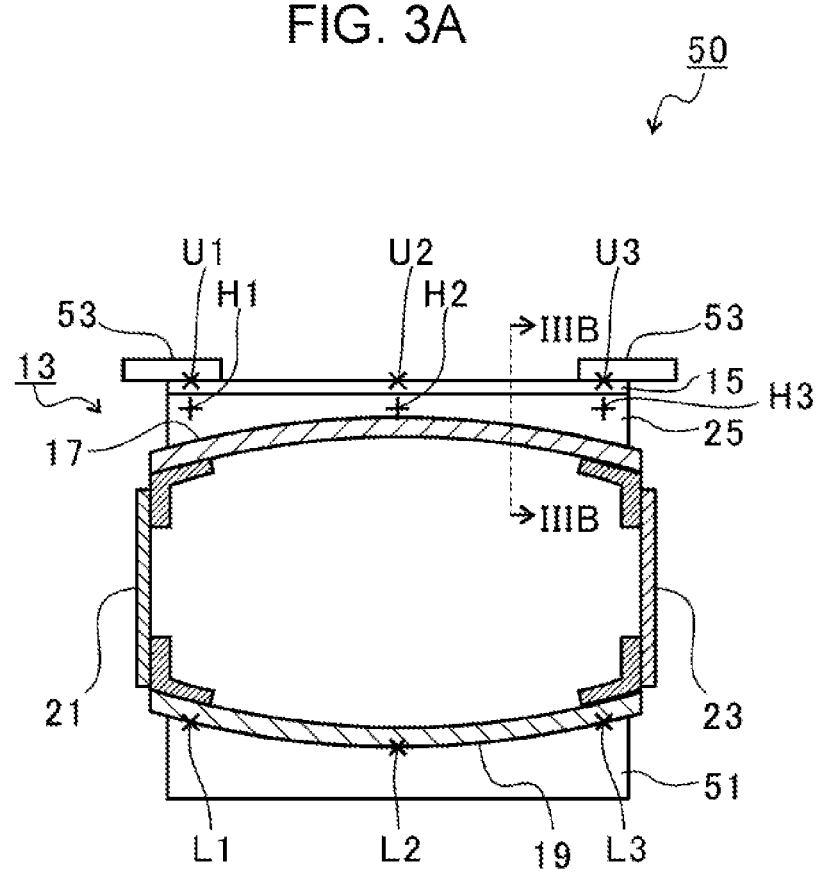
FIG. 3A and FIG. 3B schematically illustrate the structure of an assembly apparatus according to a comparative example.
Figure 3B:
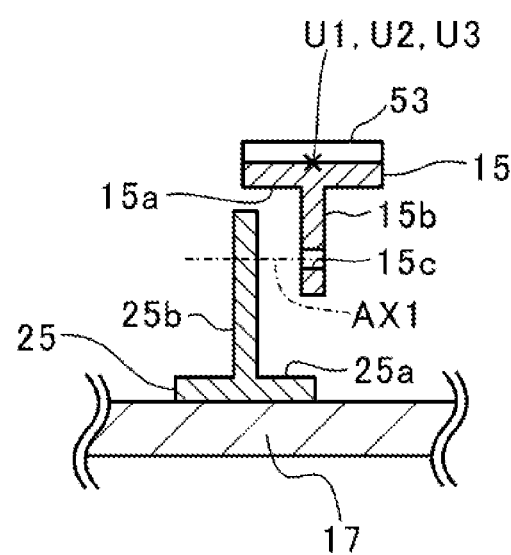

An assembly apparatus 50 for the center wing 11 according to a comparative example will now be described. FIG. 3A and FIG. 3B schematically illustrate the structure of the assembly apparatus 50 according to the comparative example. FIG. 3A schematically illustrates the structure of the assembly apparatus 50 before the coupling hole 25c is formed in the second shaped steel material 25, and FIG. 3B is a schematic sectional view taken along line IIIB-IIIB in FIG. 3A. As illustrated in FIG. 3A, the assembly apparatus 50 includes a lower jig 51, an upper jig 53, and a drilling machine (not illustrated).

The lower jig 51 is disposed vertically below the lower panel 19. The lower jig 51 retains the assembly 13 in an assembling position at a location vertically below the lower panel 19. The upper jig 53 is disposed vertically above the first shaped steel material 15. The upper jig 53 retains the first shaped steel material 15 in an assembling position at a location vertically above the first shaped steel material 15.

As described above, the cabin floor, for example, is disposed vertically above the center wing 11, and the lower surface of the fuselage is disposed vertically below the center wing 11. Therefore, it is desirable that each coordinate of the center wing 11 is accurately positioned. The lower jig 51 has coordinates L1, L2, and L3 for the design shape (design values) of the center wing 11 (assembly 13). The lower jig 51 retains the assembly 13 so that the lower surface of the lower panel 19 is positioned at the coordinates L1, L2, and L3 and that intended positional accuracy of the coordinates L1, L2, and L3 can be achieved.

Similarly, the upper jig 53 has coordinates U1, U2, and U3 for the design shape (design values) of the center wing 11 (first shaped steel material 15). The upper jig 53 retains the first shaped steel material 15 so that the upper surface of the first shaped steel material 15 is positioned at the coordinates U1, U2, and U3 and that intended positional accuracy of the coordinates U1, U2, and U3 is achieved.

The drilling machine (not illustrated) forms (drills) the coupling hole 25c in the second shaped steel material 25 while the assembly 13 is retained by the lower jig 51 in the assembling position and the first shaped steel material 15 is retained by the upper jig 53 in the assembling position. In other words, the drilling machine (not illustrated) forms the coupling hole 25c in the second shaped steel material 25 while the lower surface of the lower panel 19 is positioned at the coordinates L1, L2, and L3 and the upper surface of the first shaped steel material 15 is positioned at the coordinates U1, U2, and U3.

As illustrated in FIG. 3B, the coupling hole 15c is formed in the first shaped steel material 15. The drilling machine (not illustrated) forms the coupling hole 25c illustrated in FIG. 2B in the second shaped steel material 25 by inserting a drilling tool (not illustrated) through the coupling hole 15c and moving the drilling tool along a central axis AX1 of the coupling hole 15c.

The assembly apparatus 50 fastens the first shaped steel material 15 and the second shaped steel material 25 (assembly 13) together by inserting a fastening member (not illustrated) through the coupling holes 15c and 25c. Thus, assembly of the center wing 11 is completed.

The assembly apparatus 50 assembles the center wing 11 while the intended positional accuracy of each of the coordinates L1, L2, L3, U1, U2, and U3 is achieved by the jigs. Accordingly, the center wing 11 can be structured such that the intended positional accuracy of each coordinate is achieved. However, the lower jig 51 and the upper jig 53 used to achieve the intended positional accuracy of each coordinate are very expensive, and it is desirable to reduce the number of jigs. When the center wing 11 is assembled without using the jigs by using the assembly components as references, since the assembly components have allowable component errors and allowable assembly errors, it is difficult to achieve the intended positional accuracy of each coordinate, and the assembly accuracy is reduced. Thus, according to the comparative example, it is difficult to achieve both a reduction in the number of jigs and high assembly accuracy.

Figure 4A:
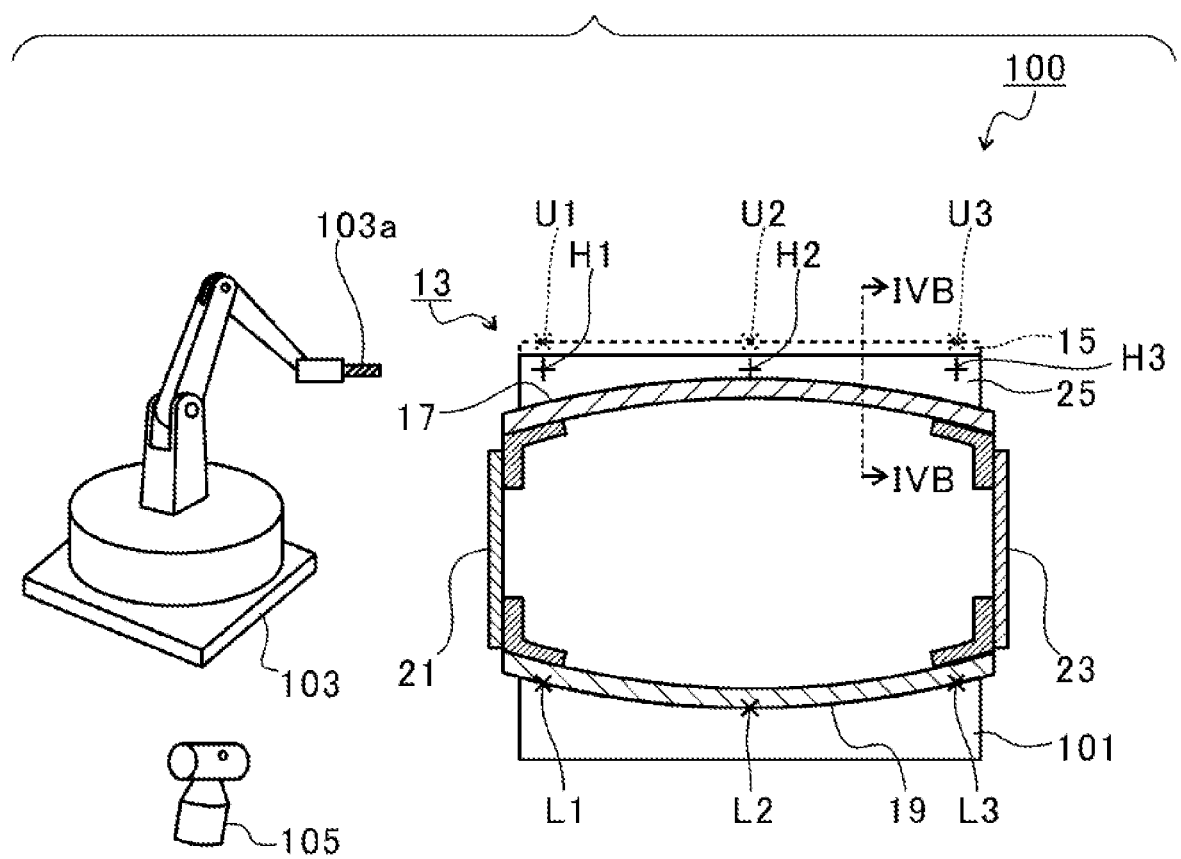
FIG. 4A and FIG. 4B schematically illustrate the structure of an assembly apparatus according to an embodiment.
Figure 4B:
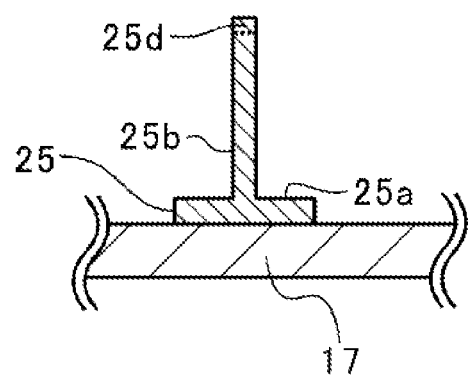

An assembly apparatus 100 according to the embodiment of the disclosure will now be described. FIG. 4A and FIG. 4B schematically illustrate the structure of the assembly apparatus 100 according to the embodiment. FIG. 4A schematically illustrates the structure of the assembly apparatus 100 before the coupling hole 25c is formed in the second shaped steel material 25, and FIG. 4B is a schematic sectional view taken along line IVB-IVB in FIG. 4A. As illustrated in FIG. 4A, the assembly apparatus 100 includes a retainer 101, a machining device 103, and a position measurement device 105.

The retainer 101 is, for example, a jig that is disposed vertically below the lower panel 19. The retainer 101 retains the assembly 13 in an assembling position at a location vertically below the lower panel 19. The retainer 101 has coordinates (reference positions) L1, L2, and L3 for the design shape (design values) of the center wing 11 (assembly 13). The retainer 101 retains the assembly 13 so that the lower surface of the lower panel 19 is positioned at the coordinates L1, L2, and L3 and that intended positional accuracy of the coordinates L1, L2, and L3 can be achieved.

The machining device 103 is, for example, a drilling machine and includes a drilling tool (tool) 103a. In this embodiment, the machining device 103 forms the coupling hole (through hole) 25c in the second shaped steel material 25 by rotating the drilling tool 103a with a motor (not illustrated).

The position measurement device 105 is, for example, a three-dimensional position measurement device that acquires three-dimensional position information by irradiating a three-dimensional object with laser light and measuring the amount of light reflected by the object. In this embodiment, the position measurement device 105 measures the tool position of the drilling tool 103a of the machining device 103 and the coordinates L1, L2, and L3 of the retainer 101. The machining device 103 controls the position of the drilling tool 103a based on the three-dimensional position information acquired by the position measurement device 105.

As illustrated in FIG. 4B, the second shaped steel material 25 of this embodiment has an excess portion 25d. In other words, the second shaped steel material 25 of this embodiment is shaped such that the length of the web 25b in the vertical direction is greater than the length of the web 25b of the comparative example in the vertical direction by the length of the excess portion 25d.

Figure 5A:
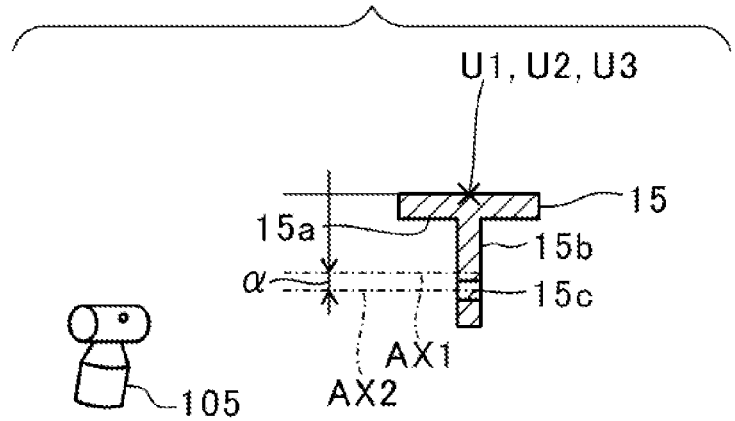
FIG. 5A and FIG. 5B illustrate a method for assembling the center wing according to the embodiment.
Figure 5B:
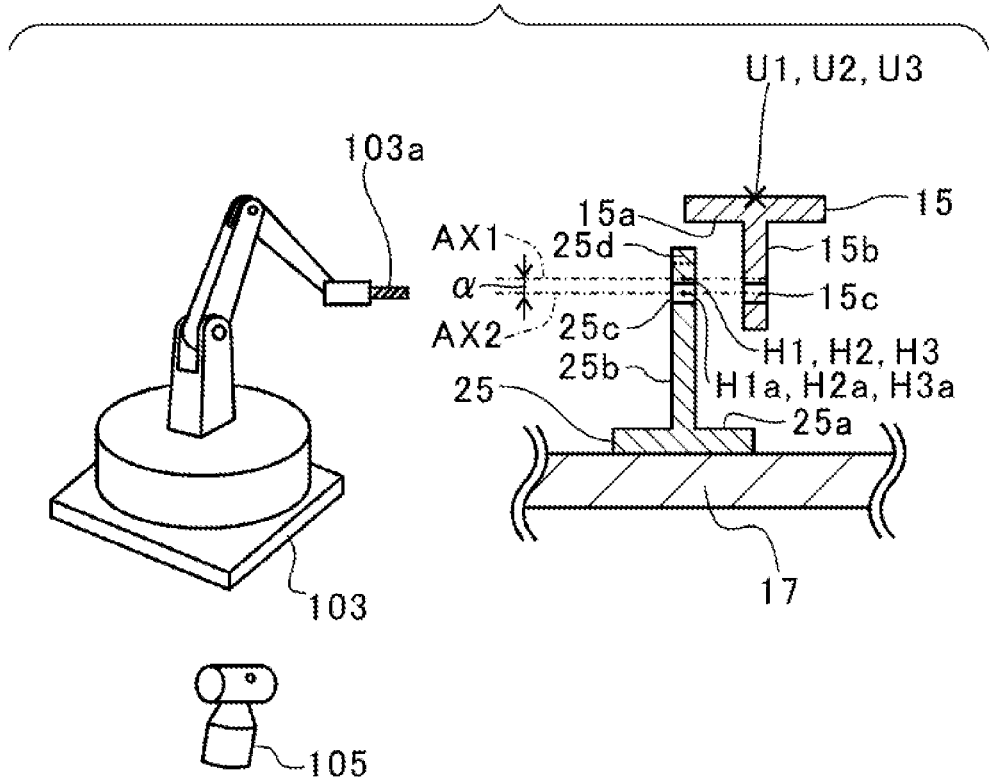

FIG. 5A and FIG. 5B illustrate a method for assembling the center wing 11 of this embodiment. FIG. 5A illustrates measurement of the amount of displacement of the coupling hole 15c in the first shaped steel material 15 by the position measurement device 105. FIG. 5B illustrates formation of the coupling hole 25c in the second shaped steel material 25 by the machining device 103.

As illustrated in FIG. 5A, the position measurement device 105 measures coordinates U1, U2, and U3 provided on the first shaped steel material 15 and a coordinate of the coupling hole 15c formed in the first shaped steel material 15 (for example, a coordinate of a central axis AX2 of the coupling hole 15c).

The position measurement device 105 stores information regarding the design shape (design values) of the first shaped steel material 15 in a memory (storage), which is not illustrated. The design values of the first shaped steel material 15 include the coordinates U1, U2, and U3 and an ideal coordinate of the central axis AX1 of the coupling hole 15c set with respect to the coordinates U1, U2, and U3. In other words, the memory stores information regarding the design shape including an intended machining position of the first shaped steel material 15. The position measurement device 105 measures the difference between the intended machining position stored in the memory and the actual machining position based on the acquired three-dimensional position information. For example, the position measurement device 105 determines the difference (hereinafter referred to as a component error) $\alpha$ between the coordinate of the central axis AX1 and the coordinate of the central axis AX2 with respect to the coordinates U1, U2, and U3.

As illustrated in FIG. 5B, the machining device 103 forms the coupling hole 25c in the second shaped steel material 25 by using the coordinates L1, L2, and L3 provided on the retainer 101 (see FIG. 4A) as references. The machining device 103 stores information regarding the design shape (design values) of the assembly 13 (second shaped steel material 25) in a memory (not illustrated). The design values of the assembly 13 include the coordinates L1, L2, and L3 and ideal coordinates H1, H2, and H3 (see FIG. 4A) of the central axis of the coupling hole 25c set with respect to the coordinates L1, L2, and L3.

As illustrated in FIG. 5B, the central axis AX2 of the coupling hole 15c in the first shaped steel material 15 is displaced from the ideal central axis AX1 of the coupling hole 15c set with respect to the coordinates U1, U2, and U3. When the machining device 103 drills a hole in the second shaped steel material 25 at the coordinates H1, H2, and H3 by using the coordinates L1, L2, and L3 as references, the central axis of the coupling hole 25c roughly coincides with the central axis AX1. Therefore, when the machining device 103 drills a hole at the coordinates H1, H2, and H3 and when the first shaped steel material 15 and the second shaped steel material 25 are fastened together by inserting a fastening member (not illustrated) through the coupling holes 15c and 25c, the upper surface of the first shaped steel material 15 is displaced from the coordinates U1, U2, and U3.

Accordingly, the machining device 103 of this embodiment determines coordinates H1a, H2a, and H3a based on the coordinates H1, H2, and H3 and the component error $\alpha$. For example, as illustrated in FIG. 5B, the machining device 103 determines coordinates shifted from the coordinates H1, H2, and H3 by the component error $\alpha$ as the coordinates H1a, H2a, and H3a. Then, based on the three-dimensional position information acquired by the position measurement device 105, the machining device 103 moves the drilling tool 103a to the coordinates H1a, H2a, and H3a by using the coordinates L1, L2, and L3 as references and then forms the coupling hole 25c in the second shaped steel material 25.

Accordingly, the central axis of the coupling hole 25c roughly coincides with the central axis AX2. Therefore, when the first shaped steel material 15 and the second shaped steel material 25 are fastened together by inserting a fastening member (not illustrated) through the coupling holes 15c and 25c, the upper surface of the first shaped steel material 15 is positioned at the coordinates U1, U2, and U3, and the intended positional accuracy of the coordinates U1, U2, and U3 can be achieved.

As described above, the assembly apparatus 100 of this embodiment measures the difference (component error $\alpha$) between the intended machining position (central axis AX1) and the actual machining position (central axis AX2) of the coupling hole 15c that is formed in the first shaped steel material 15 and that is to be coupled to the assembly 13. The assembly apparatus 100 forms the coupling hole 25c capable of communicating with the coupling hole 15c in the second shaped steel material 25 based on the reference positions (coordinates L1, L2, and L3) set on the assembly 13 and the component error α. Therefore, according to the assembly apparatus 100, the intended positional accuracy of the coordinates L1, L2, L3, U1, U2, and U3 can be achieved even when the center wing 11 is assembled without using the upper jig 53 illustrated in FIG. 3A. As a result, both a reduction in the number of jigs and high assembly accuracy can be achieved.

In this embodiment, the machining device 103 forms the coupling hole 25c based on the tool position of the drilling tool 103a measured by the position measurement device 105 and the coordinates (reference positions) L1, L2, and L3. The drilling machine according to the comparative example determines the position at which a hole is to be drilled by using an encoder provided therein. In contrast, the machining device 103 of the embodiment of the disclosure forms the coupling hole 25c based on the three-dimensional position information acquired by the position measurement device 105. Therefore, the accuracy of the drilling position is higher than that in the comparative example.

Modification

FIG. 6 schematically illustrates the structure of an assembly apparatus 100A according to a modification. Components that are substantially the same as those in the above-described embodiment are denoted by the same reference numerals, and description thereof is omitted. As illustrated in FIG. 6, the assembly apparatus 100A according to the modification includes a retainer 101A having a structure different from that of the retainer 101 according to the above-described embodiment. Other structures are the same as those of the assembly apparatus 100 according to the above-described embodiment, and description thereof is thus omitted.

According to the above-described embodiment, the retainer 101 is a jig. The modification differs from the above-described embodiment in that the retainer 101A is not a jig. The retainer 101A is, for example, a table. The table is designed so that the intended positional accuracy of the coordinates L1, L2, and L3 is achieved when the assembly 13 is placed thereon. Therefore, when the assembly 13 is placed on the table, the lower surface of the lower panel 19 is positioned at the coordinates L1, L2, and L3, and the intended positional accuracy of the coordinates L1, L2, and L3 can be achieved.

As described above, the assembly apparatus 100A according to the modification includes the table as the retainer 101A. Since the table is provided, the center wing 11 can be accurately assembled without using a jig. Thus, according to the modification, not only can the operations and effects similar to those of the above-described embodiment be obtained, the number of jigs can be further reduced from that in the above-described embodiment.

The retainer 101A may have any structure as long as the intended positional accuracy of the coordinates L1, L2, and L3 can be achieved when the assembly 13 is placed thereon, and may be, for example, a movable carrier. When the retainer 101A is a movable carrier, the retainer 101A can be moved while the assembly 13 is retained in the assembling position. Therefore, according to the assembly apparatus 100A, the center wing 11 can be more efficiently assembled.

Although an embodiment of the disclosure has been described above with reference to the accompanying drawings, it goes without saying that the disclosure is not limited to the above-described embodiment. It is clear that a person skilled in the art can arrive at various alterations and modifications within the scope described in the claims. It is to be understood that these alterations and modifications are, of course, included in the technical scope of the disclosure.

In the above-described embodiment and modification, the assembly apparatuses 100 and 100A assemble the center wing 11. However, the assembly apparatuses 100 and 100A are not limited to this, and may assemble other wings or tails. For example, the assembly apparatuses 100 and 100A may instead assemble the main wings 5, the horizontal tails 7, or the vertical tail 9.

In the above-described embodiment and modification, the machining device 103 controls the position of the drilling tool 103a based on the three-dimensional position information acquired by the position measurement device 105. However, the machining device 103 is not limited to this, and may instead control the position of the drilling tool 103a by using an encoder mounted therein.

The invention claimed is:

1. An aircraft wing assembly apparatus for fastening a first assembly component to an assembly, the first assembly component including a first coupling hole through which a fastening member for the fastening is insertable, the assembly apparatus comprising:
 a first retainer configured to hold the first assembly component in a first position when performing the fastening, the first retainer comprising a first portion that indicates a first reference position;
 a second retainer configured to hold the assembly in a second position when performing the fastening, the second retainer comprising the second position when performing the fastening, the second retainer comprising a second reference portion that indicates a second reference position;
 a drilling machine comprising a robot arm that holds a drilling tool and configured to form a second coupling hole through which the fastening member is insertable in the assembly by using the drilling tool; and
 a laser scanner configured to measure a three-dimensional position of a three-dimensional object,
 wherein the laser scanner is configured to:
  store a first intended machining position of the first coupling hole and a second intended machining position of the second coupling hole, the first intended machining position is defined relative to the first reference position, the second intended machining position is defined relative to the second reference position;
  in a state where the first assembly component is held by the first retainer, measure a three-dimensional position of the first reference portion and an actual machining position of the first coupling hole;
  calculate a difference between the measured actual machining position of the first coupling hole and the stored first intended machining position of the first coupling hole, and
 wherein the drilling machine is configured to:
  determine a target position shifted from the stored second intended machining position of the second coupling hole by the calculated difference; and
  in a state where the assembly is held by the second retainer, form the second coupling hole in the assembly by moving the drilling tool to the determined target position based on the measured relative position of the drilling tool and the measured three-dimensional position of the second reference portion.

2. The aircraft wing assembly apparatus according to claim 1, wherein the laser scanner is positioned in a fixed position relative to a base of the robot arm.

\* \* \* \* \*